Figure 1:
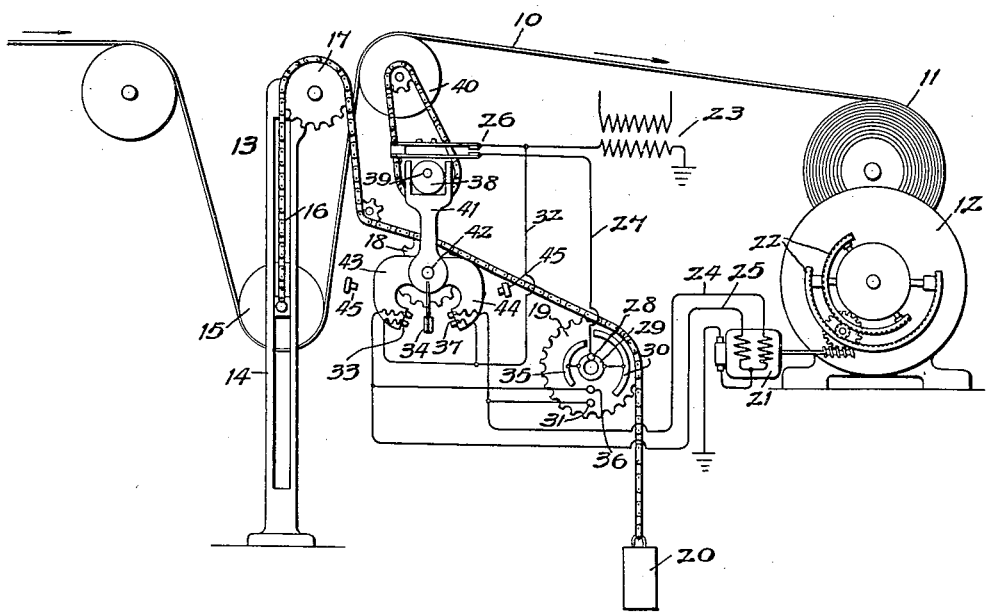

March 19, 1929.  J. I. HULL  1,706,165

SPEED CONTROL SYSTEM

Original Filed Nov. 6, 1925   2 Sheets-Sheet 1

Inventor:
John I. Hull,
by *Alexander S. ____*
His Attorney.

March 19, 1929.  J. I. HULL  1,706,165

SPEED CONTROL SYSTEM

Original Filed Nov. 6, 1925  2 Sheets-Sheet 2

Fig. 4.

Fig. 5.

Inventor:
John I. Hull,
by
His Attorney.

Patented Mar. 19, 1929.

1,706,165

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SPEED-CONTROL SYSTEM.

Application filed November 6, 1925, Serial No. 67,473. Renewed November 13, 1928.

My invention relates to a system of automatic control and it is particularly useful as an automatic speed controller for electric motors and it will be described as such. The primary object of my invention is to provide a controller for automatically maintaining a desired operating relation between two pieces of machinery or between two segregated parts of the same machine. For example, in the textile industry the roll which receives the finished fabric must be rotated at a speed proportional to the rate at which the fabric is produced and at the same time its speed may need to be compensated for a gradually increasing diameter of the roll or the like. Another object of my invention is to provide a speed control system of the character above indicated which is exceptionally free from hunting.

In my copending application, Serial No. 67,472, filed concurrently herewith, I have described a speed control system of this general character in which mechanical contact making and breaking devices operated by a speed gauging device are provided to control the energizing circuits of a reversible pilot motor. In that case the pilot motor was energized intermittently for one direction of rotation or the other over periods which varied from zero period of energization to continuous energization, depending upon the extent of regulation required. In the present invention the above action is supplemented by means which may at times momentarily energize the pilot motor for opposite directions of rotation simultaneously, the periods of duration of energization for the two opposite directions of rotation being relatively varied so as to give a resultant energization which may vary the speed and direction of rotation of the pilot motor in a manner which secures rapid regulation when this is needed for correction of a large error and at the same time eliminates hunting action. The extent of energization for that direction of rotation which tends to decrease the motion of the gauging device is made dependent upon and varying with the rate of motion of the gauging device, while the other energization is zero for a central zone of travel of the gauging device, but is maintained at a predetermined value for the two zones outside the central zone and is always in such a direction as to tend, by its action upon the motor speed, to return the gauging device towards the central zone. Thus, when the device is in one of the outer zones and moving away from the central zone, the two energizations combine to oppose this motion and center the device, but as soon as the motion reverses the first described energization itself reverses and by its opposition to the centering action limits the rate of return so that any tendency to overcorrect and hunt is greatly reduced.

Figure 2:
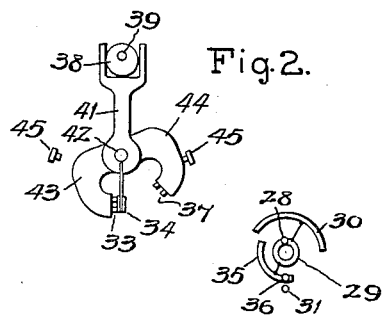
Figure 3:
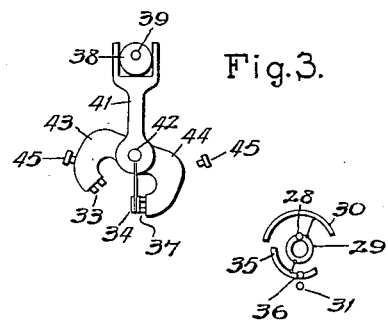

The features of my invention, which are believed to be novel and patentable, will be pointed out in the claims appended hereto. For a better understanding of the invention, reference is made in the following description to the accompanying drawings in which Fig. 1 is a diagrammatic illustration of the invention as applied to the speed control of a motor driven roll in the textile industry; Figs. 2 and 3 represent different operating positions of the apparatus, and Figs. 4 and 5 represent detail of a preferred form of the switching mechanism diagrammatically represented in Fig. 1.

Referring to Fig. 1, 10 represents a strip of finished cloth as it comes from the textile mill. It is wound on the roll 11 which is driven by an electric motor 12. The cloth passes through what is known in the industry as a compensating gate 13 which serves the double purpose of keeping the cloth smooth and taut and regulating the speed of the motor 12. The compensating gate consists of spaced vertical guides 14 for supporting the weighted roller 15 which is allowed to move up and down in the frame to keep the cloth taut, the cloth supporting the weight of the roller less the weight of the counterweight 20 as represented. A chain 16 is attached to the end bearing of the roll and passes over sprocket wheel 17 at the top of the frame and then about sprocket wheels 18 and 19 of the regulating apparatus and is held taut by the weight 20.

It will be evident that if the motor 12 operates too slow roll 15 will be lowered, and that if motor 12 operates too fast roll 15 will be raised rotating the wheels 18 and 19 and the parts moved thereby accordingly. Motor 12 is here represented as an alternating current commutator motor of a type adapted to have its speed changed by shifting the brushes with respect to the commutator. I have represented a reversible pilot motor 21 suitably geared to the brush yokes 22 of motor 12 for shifting the brushes, and it will be understood that when the pilot motor operates in one direction the brushes of motor 12 are shifted to raise its speed and when the pilot motor operates in the reverse direction the speed of motor 12 is lowered. Motor 21 is shown as a split field series alternating current commutator motor which receives its energization from a transformer 23 through the contacts of the regulating apparatus and circuits 24 and 25. As illustrated, circuit 24 is the energizing circuit for that direction of rotation of pilot motor 21 which shifts the brushes of motor 12 in a direction to lower its speed and circuit 25 is the corresponding circuit for the reverse regulation. It will be observed that each of the circuits 24 and 25 have two paths through which they may be energized from transformer 23. Thus circuit 24 may be energized through contacts 26, wire 27, stationary brush 28, slip ring 29, segmental slip ring 30 and stationary brush 31, or it may be energized through wire 32 and contacts 37 and 34. Circuit 25 may be energized through contacts 26, wire 27, brush 28, ring 29, segmental slip ring 35 and stationary brush 36, or through wire 32 and contacts 34 and 33.

Rings 29, 30 and 35 are suitably secured to wheel 19 and rotate with it in accordance with the up and down movement of roll 15.

The position of the parts represented in Fig. 1 is for the central position of roll 15, and at this time it will be seen that segmental rings 30 and 35 are out of contact with their cooperating brushes 31 and 36 so that there is a short range of movement of the roll 15 at the central position where these contacts remain open. If the roll rises beyond this range, ring 30 is rotated into contact with brush 31 and if the roll 15 is lowered beyond this range, segment 35 is rotated into contact with brush 36. These segments are of sufficient length to maintain contact throughout the extreme movements of roll 15 and the complete range of movement of roll 15 from top to bottom corresponds to nearly one revolution of wheel 19. The central portion of the movement of roll 15 where neither of brushes 31 and 36 are in contact with their cooperating segmental rings will hereinafter be referred to as the "idle zone" and movements beyond the idle zone where contact is made with rings 30 and 35 will be referred to as centering zones. The regulation performed by this part of the mechanism may be termed a position correcting regulation.

As shown in Fig. 1, the circuit between transformer 23 and brush 28 is open at contacts 26. However, these contacts are arranged to be alternately closed and opened by means of a cam 38 mounted on a shaft 39, which shaft is driven continuously from some part of the machine as from the roll 40 as shown. The cam 38 also oscillates the arm 41 which is pivoted on shaft 42. This arm carries the contactor 34 and the operation is such that contactor 34 is oscillated back and forth towards and away from cooperating contacts 33 and 37 continuously. Frictionally mounted on shaft 42, which is rotated by wheel 18 whenever the roll 15 rises or falls, are the arms 43 and 44 which carry the contacts 33 and 37 respectively. Outward movements of these arms are limited by stops 45 and their inward movements are limited by the oscillating contact 34.

If the roll 11 is driven faster than the fabric 10 is fed to it, the roll 15 will start to rise and this will rotate shaft 42 and wheel 19 in a clockwise direction. Contact arm 43 will be moved against stop 45 and contact arm 44 will be moved so that its contacts 37 move against oscillating contact 34. Then each time contact 34 oscillates to the right it will close the circuit 24 at contacts 37 and at the same time move arm 44 back the extent it has advanced since the previous oscillation. If the rise of roll 15 is rapid shaft 42 may move arm 44 to advance its contacts 37 at the same or at a greater rate than that at which the contact 34 moves to the left, in which case the circuit will be maintained closed continuously thereby until the movement of roll 15 slows down. Thus it is seen that the percentage of time of one oscillation of contact 34, during which contact is established thereby, varies from 0 to 100%, depending upon the rate of movement of roll 15. If the movement of roll 15 is downward the reverse operation takes place between contact 34 and contacts 33, arm 44 being moved to the right until the movement of roll 15 stops or until the arm 44 comes against its stop 45.

It will thus be seen that the position of arms 43 and 44 are in no way dependent upon the vertical position of roll 15 but only on the last previous movements of roll 15, and that the direction and extent of regulation by this part of the mechanism depends only upon the direction and rate of vertical movement of roll 15. Thus a dead beat regulation can be obtained by this part of the mechanism, because the slower the motion of the roll 15, acting as a gauging device for the mechanism, the slower the motion of the pilot motor 21 until when the gauging device has almost stopped the pilot motor will be jogged only slightly. This jogging continues until motion of the gauging device has been entirely eliminated. The regulation produced by this part of the mechanism may thus be appropriately termed a rate correcting regulation. It will appear that this rate correcting regulation may overlap the idle zone or the centering zones previously described. If the rate correcting regulation occurs in the idle zone the pilot motor is controlled by this regulation alone. If it occurs in a centering zone the pilot motor is subject to the resultant regulation of both parts of the mechanism or to the resultant of the rate correcting and position correcting regulations. These two regulations may be such as to energize the pilot motor for the same direction of rotation or for reverse directions of rotation, depending upon the position and direction of movement of roll 15, and the magnitude of the resultant regulation will be influenced by the rate of movement in any given case.

The nature of this resultant regulation will be made clearer by assuming different operative conditions. Starting with the apparatus in the condition represented in Fig. 1 let us assume that roll 15 starts to slowly descend due to a too slow operation of motor 12. Shaft 42 and wheel 19 will start to turn in a counter-clockwise direction, and very soon contacts 33 will be moved against the oscillating contact 34 and circuit 25 of pilot motor 21 will be energized intermittently jogging the motor and very slightly shifting the brushes of motor 12 in a direction to increase its speed. A few such regulating impulses may be sufficient to correct the speed, but let us assume that the roll 15 continues to descend until segment 35 comes in contact with brush 36. It will be noticed that the cam 38 is arranged to close contacts 26 at the central position of contact 34 so that if the movement of roll 15 is slow, such that contact 34 moves away from contacts 33 before it reaches a central position, the circuit 25 of motor 21 will be closed at one instant at 33 and at the next instant at 26, increasing the excitation of motor 21 and increasing the regulation. The parts will then be in some such position as represented in Fig. 2.

Let us now assume an unusual condition such as to increase the rate at which roll 15 descends. The regulation through contacts 33 will increase in proportion to the increase in rate up to a point where these contacts remain closed all the time and pilot motor 21 is rotated at full speed in a direction to raise the speed of motor 12. The descending movement of roll 15 decreases and is finally checked, and the speed correcting regulation through contacts 33 decreases to zero. In the meantime segment 35 has been moved still farther into the centering zone away from the idle zone, and the intermittent position correcting regulation continues.

Let us now assume that the unusual condition which caused roll 15 to descend rapidly becomes normal. The speed of motor 12 is too high and the roll 15 ascends rapidly such as to swing contacts 37 on arm 44 into continuous contact with oscillating contact 34, as shown in Fig. 3. Now since circuit 24 is continuously energized at 37 and circuit 25 is only intermittently energized at 26 the resultant excitation of motor 21 is reversed and is such as to lower the speed of motor 12. The decrease in speed of motor 12 causes a decrease in the speed correcting regulation until it is equal to the position correcting regulation and the resultant effective excitation of pilot motor 21 becomes zero.

Thus the apparatus approaches and enters the idle zone at a slow rate of movement which is gradually corrected by the speed correcting regulation which again becomes effective in the idle zone after segment 35 moves off from brush 36. The interrupter 26 can be arranged with reference to cam 38 as to produce any desired amount of interruption from 0 to 100% to suit conditions or it may in many cases be omitted thus giving continuous energization for the centering actions while the apparatus is in the centering zones.

With this apparatus only a small idle zone is necessary because after an abnormal speed change the apparatus is brought back to the idle zone at a moderate rate, irrespective of the extent to which the apparatus was moved from the idle zone due to the abnormal condition.

The two parts of the control mechanism are preferably combined in a unitary structure, as shown in Figs. 4 and 5, which represent views taken at right angles to each other through a casing 46 containing the switch structure where the corresponding parts are numbered the same as in Fig. 1. The frictional engagement between shaft 42 and arms 43 and 44 is made by pressing these arms against collars 47 by means of springs 48, the collars 47 being secured to the shaft 42. The various contacts as well as the stops 45 are made to have a suitable range of adjustment, and the contacts are suitably insulated. The rings 29, 30 and 35 are secured to a bushing 49 mounted on the hub of gear 52. Gear 52 is free to turn on shaft 39 and is driven from shaft 42 by means of gear 51. This makes a rugged compact structure with the moving parts protected from dust and dirt. By placing the contacts 26 in the position shown where they will be closed by cam 38 when contact 34 is in the center of its oscillating range, contacts 26 will have the same regulating effect with respect to both contacts 33 and 37. Another way of stating this is to say that the period of closure of contacts 26 will overlap the periods of closure of contacts 33 and 37 to the same extent for the same rates of movement of shaft 42 in opposite directions.

If the contacts 26 were placed as shown at 26' so as to be closed when the contact 34 is in its extreme oscillating position to the right, then the regulation due to the closure of contacts 26' would have a maximum effect upon the regulation due to the closure of contacts 33 and 34 and a minimum effect upon the regulation due to the closure of contacts 34 and 37. A speed-reducing regulation of a given amount is more quickly followed by a corresponding drop in speed than is a speed increasing regulation of the same amount followed by a corresponding rise in speed; consequently it will generally be desirable to have the speed increasing regulation or that produced by contacts 33 more pronounced than that produced by contacts 37. By placing the contacts as at 26' this object is accomplished Obviously some intermediate position between the two positions shown for contacts 26 with respect to the cam may be selected such as to give the best results, or contacts like 26 may be placed on both sides, one for up regulation and the other for down regulation.

In accordance with the provisions of the patent statutes, I have described the principles of operation of my invention, together with the apparatus which I now consider to represent the best embodiment thereof; but I desire to have it understood that the apparatus shown and described is only illustrative, and that the invention may be carried out by other arrangements. Where I have specified a textile machine I of course intend to include equivalent machines.

What I claim as new and desire to secure by Letters Patent of the United States, is:—

1. In a regulating system including a machine employed to operate on a material which is subject to a variable movement, means for controlling the rate of operation of said machine on the material comprising a gauging device adapted to be moved in opposite directions from a central position in response to opposite regulating requirements of the rate of operation of said machine on the material, a regulator for said machine comprising means responsive to a departure of said gauging device from a central position, means responsive to the rate of movement of said gauging device toward or from a central position, and means controlled by both of said means for producing a resultant corrective regulation of the rate of operation of said machine on the material.

2. In a regulating system for a machine, a gauging device adapted to be moved in opposite directions from a central position in response to opposite regulating requirements of such machine, an electric regulator having two energizing circuits for respectively producing opposite regulating effects on such machine, means acted upon by said gauging device in response to departures thereof from a central position for energizing one or the other of said circuits, depending upon the direction of departure, and means acted upon by said gauging device in means to the rate of movement thereof for response to the one or the other of said circuits, depending upon the direction of movement, said two means acting separately or together in the same or opposite directions in accordance with the regulating requirements to produce a resultant corrective regulation of said machine.

3. In a regulating system for a machine, a gauging device arranged to be moved in opposite directions from a central position in response to opposite regulating requirements of such machine, an electric regulator having two energizing circuits for respectively producing opposite regulating effects on such machine, means acted upon by said gauging device in response to departures thereof from a central position for intermittently energizing one or the other of said circuits depending upon the direction of departure, and means acted upon by said gauging device in response to and in proportion to the rate of movement thereof for energizing one or the other of said circuits, depending upon the direction of movement, said two means acting separately or together in the same or opposite directions depending upon the regulating requirements to produce a resultant corrective regulation of said machine.

4. In a regulating system for a machine of the character described operating on a material which is subject to a varying rate of movement, means for controlling the operation of said machine on the material comprising, a gauging device arranged to be moved in opposite directions from a central position in response to opposite regulating requirements of such machine with respect to its operation on said material, a position correcting regulator having an idle central zone and active centering zones acted upon by said gauging device in response to departures from a central position, a rate correcting regulator responsive to the rate of movement of said gauging device, and means responsive to the joint action of both of said regulators for producing a resultant corrective regulation of said machine, such as to control its operation substantially in response to variations in the rate of movement of the material.

5. In a regulating system for a machine of the character described operating on a material which is subject to a varying rate of movement, means for controlling the operation of said machine on the material comprising, a gauging device arranged to be moved in opposite directions from a central position in response to opposite regulating requirements of such machine with respect to its operation on said material, a position correcting regulator having an idle central zone and active centering zones acted upon by said gauging device in response to departures thereof from a central position, a rate correcting regulator arranged to have a short idle zone immediately following a change in direction of said gauging device but otherwise active in response to the rate of movement of said gauging device, and means responsive to both of said regulators for producing a resultant corrective regulation of said machine such as to control its operation substantially in response to variations in the rate of movement of the material.

6. In a regulating system for a machine, an electric regulator for controlling such machine, said regulator having two energizing circuits for respectively producing opposite regulating effects upon such machine, two sets of contacts arranged in parallel in each energizing circuit, means responsive to the extent of departure of said machine from a desired condition for closing one set of contacts in the circuit necessary to correct for such departure, and means responsive to the rate of departure of said machine to or from the desired condition for closing the other set of contacts in the circuit necessary to reduce such rate whereby said electric regulator receives a resultant energization and the machine a resultant regulation necessary to substantially maintain the desired condition without hunting.

7. In a regulating system for a machine, an electric regulator for controlling such machine, said regulator having two energizing circuits for respectively producing opposite regulating effects upon such machine, means for intermittently energizing one or the other of said circuits in response to the extent of departure of said machine from a desired condition, and means responsive to the rate of departure of said machine toward or from the desired condition for intermittently closing one or the other of said circuits, the extent of closure produced by the rate responsive means being proportional to such rate, and the circuit closed in each case being such as to energize the electric regulator in the proper direction to correct for the responsible condition.

8. In a regulating system where a motor operates upon a continuous material which is subject to a variable rate of feed, means for controlling the speed of said motor comprising a gauging device moved in opposite directions from a central position in response to slow and fast rates of feed of said material as compared to the speed which said motor operates thereon, means controlled by said gauging device in response to the direction and extent of movement thereof from a central position, means controlled by said gauging device in response to the direction and rate of movement thereof, and a speed regulator for said motor controlled jointly by said two means to produce a resultant regulation of the speed of said motor tending to maintain said gauging device near a central position without hunting.

In witness whereof, I have hereunto set my hand this 5th day of November, 1925.

JOHN I. HULL.